May 11, 1954 P. L. ADAMS 2,678,074
FLOAT AND COUPLING THEREFOR
Filed April 9, 1951
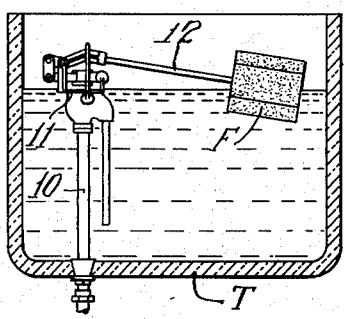
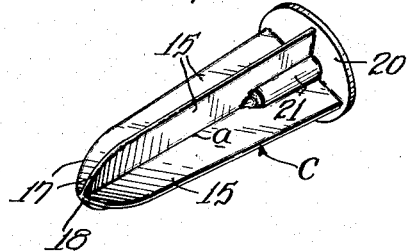
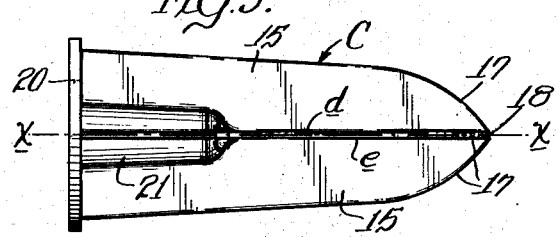
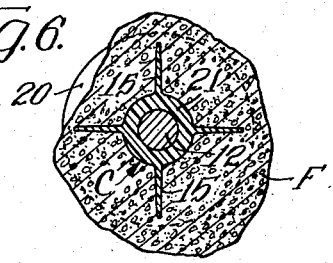
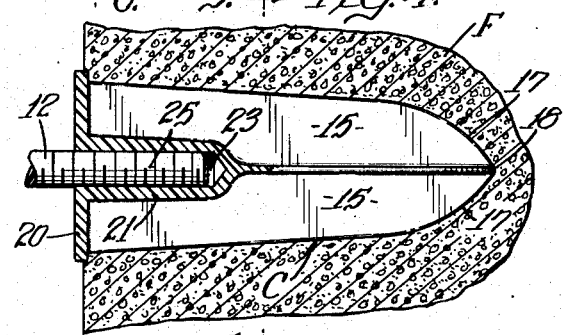
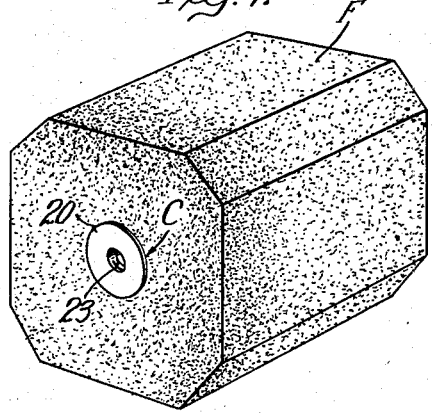
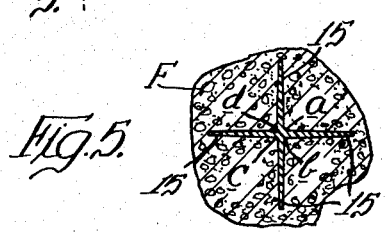
INVENTOR.
Paul L. Adams.

Patented May 11, 1954

2,678,074

UNITED STATES PATENT OFFICE 2,678,074

FLOAT AND COUPLING THEREFOR

Paul L. Adams, Dubuque, Iowa, assignor to Frederic A. Robinson and Ardis V. Robinson, doing business as Robinson Industries Application April 9, 1951, Serial No. 220,089

2 Claims. (Cl. 151—41.73)

This invention is concerned with a float and with a coupling therefor whereby to secure the threaded end of a rod to a float of buoyant material, such as solidified foam. Such a float would be eminently suitable for use in a small tank wherein an inlet valve is responsive to the water level within the tank. This invention in certain of its phases was first disclosed in my application for patent filed October 18, 1949, under Serial No. 122,059. The combination of a buoyant float and a coupling therefor whereby to secure the threaded end of a rod to the float is claimed in my application, Serial No. 382,319, filed September 28, 1953, which is a division of this application.

A float material for which the present coupling has been especially designed is now available on the market, known as "Styrofoam." This is a polystyrene plastic produced in the form of a solidified foam. Another float material having some similar physical characteristics is glass foam. Both of such materials, to mention no others, are light, buoyant, non-corrosive, inexpensive, and well adapted for use as a valve float, especially in a sanitary toilet water closet or tank. However, the difficulty of establishing a satisfactory connection between such a float material and a metallic rod by which the valve is operated is such that it has not been possible heretofore to use one with the other. This arises from the fact that a solified foam product of this kind has practically no mechanical strength, its numerous cellular walls are readily crushed, and the minor degree of elasticity which inheres in its wall structure cannot readily be availed of without danger of crushing the cellular walls of the float.

The coupling of this invention may optionally be produced from a plastic material which is chemically homologous with the float itself. The coupling, however, is not cellular, but is formed to provide a plurality of thin fins affording a minimum of resistance to axial advance of the coupling with the float body and a maximum area of surface for engagement therewith when inserted in place. The connection between such a coupling and the float body may be largely or wholly frictional and, when the coupling is produced according to this invention, it may readily be forced endwise into the float body. In so doing, the coupling, as it advances, crushes the walls of the float and also compresses them very slightly so that the value of its frictional engagement with the coupling is materially enhanced.

A coupling having these special characteristics, designed particularly for use with a float body having a cellular wall structure that is readily crushed, so as to render difficult any connection therewith of a rod or other like device, is illustrated in the accompanying drawing in the manner following:

Figure 1 is a view in vertical section of a conventional water closet tank, showing in elevation the present float installation;

Fig. 2 is a view in perspective of the present coupling, looking toward its rear end;

Fig. 3 is a side elevation of the coupling;

Fig. 4 is a longitudinal section through the coupling as it appears when inserted in a float of solidified foam material;

Fig. 5 is a transverse section, taken on line 5—5 of Fig. 4;

Fig. 6 is a similar view, taken on line 6—6 of Fig. 4; and

Fig. 7 is a perspective view looking toward the front end of a valve float which is equipped with the present coupling ready to be connected to a valve rod.

As an example of one use to which the present coupling may be put, I have shown in Fig. 1 a water closet tank T having an inlet pipe 10 equipped with a valve 11 from which is extended an operating rod 12 for connection with a float F which is attached to its free end by means of the present coupling C which is shown in detail in Figs. 2–6.

The coupling C comprises four elongated fins 15 which are extended radially at distances of 90° apart, from a common longitudinal axis indicated by the broken line x—x in Fig. 3. Each fin is relatively thin, and joins with the adjacent fins along the line a, b, c, or d (see Fig. 5) all of which are parallel with the axis x—x and very close thereto for a major portion of the length of the coupling. The outer edges of the fins are tapered very slightly inwardly toward the rear end, and terminate in inwardly-inclined noses 17 which meet substantially at a point 18 which is coincident with the axis x—x of the coupling.

At the forward end of a coupling is a disc-like head 20 that is joined to the proximate ends of the fins so as to provide a reinforcing support therefor. Also extending rearwardly from the head is a small chambered body 21, cylindrical in form, but continuing for only a minor portion of the length of the coupling. This cylindrical body opens out upon its front end where a communicating hole 23 is provided in the head axially thereof. Within the chambered body screw threads are formed for engagement with the threaded end portion 25 of the valve operating rod 12.

One noteworthy characteristic of the present coupling is the presence of four elongated radial fins, spaced apart 90°, to facilitate economical production by a molding operation, these fins extending through the major portion of the length of the coupling with bases defined by the four parallel lines $a$, $b$, $c$ and $d$ which are located close to the coupling axis. As a result, the surface area of each fin is maintained at the maximum, its cross sectional area is held to a minimum, and the only discontinuity thereto is the small cylindrical body 21 which extends from the front end rearwardly for only a minor portion of the coupling length.

In use, the coupling is forced endwise into the float body to a distance such that its head 20 will lie substantially flush with its penetrated face. If desired, a cement may be applied to the coupling, before its insertion, so as to impart an adhesive value to its connection with the float. It is even possible for this purpose to include in the cement a material having a slight solvent property whereby to establish a homogeneous bond with both the coupling and the float body. For polystyrene plastic products this would desirably be a suitable solvent. As a result, the coupling when installed within the float body will remain securely connected thereto so as to condition the float body for attachment to the threaded end 25 of the valve rod 12.

When the coupling is advanced endwise into a float body of solidified foam characterized by readily crushable cellular walls, a slight compression of such walls takes place in the area immediately surrounding the coupling. The property of resiliency inherent in the cellular walls, although slight, exerts upon the contacted surfaces of the coupling a reactive pressure tending to enhance the frictional value of its engagement with the float body cellular walls.

In this same connection, it will be noted that the coupling's diameter, in the plane of either pair of opposite fins is very substantial as compared with that of the valve rod. The fins accordingly extend into the body of the float a distance which is sufficient to be substantially removed from the axis of the coupling, and offer to the surrounding cellular walls of the float an extended surface area to be engaged thereby. These fins are also of ample extent, both radially and longitudinally, to transmit safely to the surrounding float body all torsional strains which are encountered when the float is applied rotatively to the threaded end of the valve rod. As a result, the coupling may be screwed firmly onto the rod for a distance substantially equal to the length of the chamber within the body 21, thereby to secure a normally inseparable connection with the rod.

The cross sectional form and area of the coupling (see Fig. 5) is such as to offer a minimum of resistance to endwise advance of the coupling when pushed into the float body. This is due to its very small cross sectional area, the narrowness of the fins, and their inclination inwardly toward the rear end of the coupling. Because the resistance to the coupling advance is thereby so substantially reduced, there is but very little damage to the cellular wall structure of the float resulting from the forced insertion of the coupling therewithin. This is of advantage because the crushing and breaking of the cellular walls of the float is confined to the area immediately contiguous to the fin surfaces; elsewhere, as in the area between the fins, the cellular wall structure remains intact and, in consequence, exerts a greater resilient reactive pressure on the coupling. All these factors of excellence contribute to the float body's frictional hold upon the coupling—a hold so secure as to render feasible for the first time the secure connection thereto of a small rod.

The cellular walls of the float body are pressure-engaged with the opposite flat faces of the fins whose aggregate area constitutes by far the major part of the surface of the coupling. It is largely because of the honey-combed structure of its body that the float is buoyant in a high degree. The coupling, however, is solid, or relatively so, even though it may be chemically homologous to the float, so that the coupling weight, per unit of mass, is too heavy to float. Because the coupling is incorporated in the float body, and possibly even integrated therewith, buoyancy of the float overcomes by a wide margin of safety the sinking tendency of the coupling. The entire float structure is thus one where a solid non-floating coupling is utilized as a core in a surrounding cellular body which has ample buoyancy to qualify it for many purposes.

I claim:

1. As a new article of manufacture, a one-piece valve float coupling comprising four thin fins elongated lengthwise of the coupling and radially extended 90° apart from the coupling axis to meet in right angular relationship along parallel lines proximate to the axis of the coupling for a major part of its length, each fin being inclined inwardly at one end to join with the others in forming substantially a point at the axis of the coupling, a disc-head for the coupling disposed transversely of its axis at the coupling end oppositely of its axial point and joined integrally to the proximate ends of the several fins to provide radial support therefor, and a chambered cylindrical body coaxial with the coupling and joined at one end to the head through which is an opening communicating with the body chamber, the body being extended away from the head toward the opposite end of the coupling but for only a minor part of the length thereof whereby to leave undisturbed the right angular relationship of the fins along parallel lines proximate to the axis of the coupling for the major part of its length.

2. As a new article of manufacture, a one-piece valve float coupling comprising four thin fins elongated lengthwise of the coupling and radially extended 90° apart from the coupling axis to meet in right angular relationship along parallel lines proximate to the axis of the coupling for a major part of its length, the outer edge of each fin being inclined slightly inwardly toward one end whereat it is further inclined inwardly to join with the others in forming substantially a point at the axis of the coupling, a disc-head for the coupling disposed transversely of its axis at the coupling end oppositely of its axial point and joined integrally to the proximate ends of the several fins to provide radial support therefor, and a chambered cylindrical body coaxial with the coupling and joined at one end to the head through which is an opening communicating with the body chamber, the body being extended away from the head toward the opposite end of the coupling but for only a minor part of the length thereof whereby to leave undisturbed the right angular relationship of the fins along parallel lines proximate to the axis of the coupling for the major part of its length.

References Cited in the file of this patent

UNITED STATES PATENTS

| Number | Name | Date |
|---|---|---|
| 375,177 | McKinnon | Dec. 20, 1887 |
| 585,449 | Rockwell | June 29, 1897 |
| 722,046 | Rieger | Mar. 3, 1903 |
| 1,257,295 | Slattery | Feb. 19, 1918 |
| 1,271,459 | Greeson | July 2, 1918 |
| 1,466,494 | Wallman | Aug. 28, 1923 |
| 1,538,789 | Flemming | May 19, 1925 |
| 1,681,048 | Purcell | Aug 14, 1928 |
| 2,343,975 | Hosfield | Mar. 14, 1944 |
| 2,358,472 | Owens | Sept. 19, 1944 |
| 2,446,174 | Flynt | Aug. 3, 1948 |

FOREIGN PATENTS

| Number | Country | Date |
|---|---|---|
| 567,153 | Great Britain | 1945 |

OTHER REFERENCES

Modern Plastics—March 1945—page 202.